Feb. 6, 1951
S. W. HYATT
2,540,888
CABLE-CLAMPING AND ANCHORING DEVICE
Filed Feb. 13, 1950
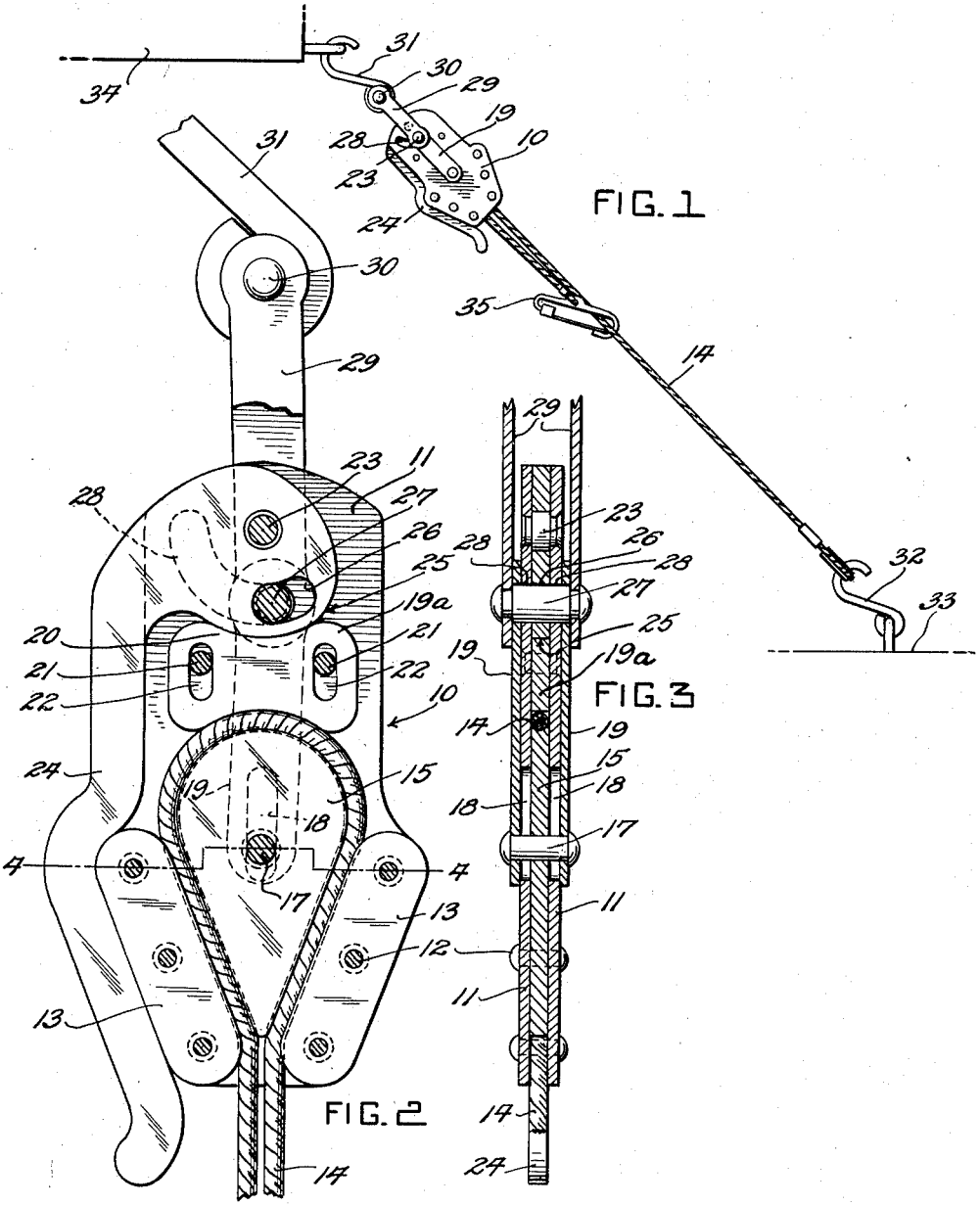
INVENTOR.
Samuel W. Hyatt
BY
W. S. McDowell
ATTORNEY Patented Feb. 6, 1951

2,540,888

UNITED STATES PATENT OFFICE 2,540,888

CABLE-CLAMPING AND ANCHORING DEVICE

Samuel W. Hyatt, Columbus, Ohio, assignor to D. L. Auld Company, Columbus, Ohio, a corporation of Ohio Application February 13, 1950, Serial No. 143,892

5 Claims. (Cl. 24—68)

This invention relates to cable-anchoring mooring devices and, more particularly, to an improved adjustable mooring device of the type employed in anchoring, or "tying-down" aircraft or cargo within aircraft.

The present application is a continuation-in-part of my copending application, Serial No. 68,611 filed Dec. 31, 1948, entitled Cable-Anchoring and Tightening Device.

It is a primary object of the present invention to provide an improved mooring or anchoring device which comprises a length of flexible cable having one end adapted for connection to a stationary support, and having at the opposite end thereof an adjustable cable-clamping device provided with hook means for attachment to an object to be moored or anchored, and wherein said cable clamping device embodies means for simultaneously clamping a cable introduced therein while decreasing the effective length of the object-engaging means to provide a taut connection between a mooring support and an object to be connected thereto.

It is another object of the present invention to provide an improved cable-type anchoring device which is capable of fast and facile action in securely clamping the free end portion of a cable while simultaneously decreasing the effective length of such cable with respect to a stationary object, whereby to tighten the connection between the cable and an object to be anchored or moored.

A further object of the present invention is to provide a cargo tie-down which embodies a relatively small and compact casing in which is mounted a cable-receiving post or sheave about which the free end portion of a cable may be looped or trained, and a sliding wedge member which may be moved by actuation of a single manually operable lever to securely clamp the looped cable within said casing while simultaneously decreasing the extension of an associated cargo-engaging hook member whereby to securely anchor such cargo with respect to a stationary support.

These and various other objects and advantages will become readily apparent by reference to the following description and the accompanying drawing, wherein:

Fig. 1 is an elevational view of the present anchoring device operatively connected between a stationary support and a relatively movable object;

Fig. 2 is a medial longitudinal vertical sectional view taken through the present anchoring device;

Fig. 3 is a transverse vertical sectional view taken along the line 3—3 of Fig. 2;

Fig. 4 is a horizontal sectional view taken along the line 4—4 of Fig. 2.

Referring now to the drawing, the numeral 10 designates generally the casing of the present anchoring device which, advantageously, may comprise a pair of spaced complemental side plates 11 secured to one another by means of rivets or other suitable fastening devices, as at 12, and normally spaced from one another by means of a pair of adjacent angularly related blocks or abutments 13. The blocks 13 are disposed within the lower end of the casing and form therein a vertically tapered chamber opening toward the lower end of the casing. The blocks 13 may constitute separable members with respect to the casing, or may be formed integral with one or more of the sections 11. The inner or adjacent edges of the blocks 13 define a vertically tapered socket within the chamber provided between the sections 11, into which may be trained the free end portion of a length of flexible cable 14, as will be hereinafter more fully described.

Slidably carried between the side plates or sections 11 of the casing is a combination cable-receiving and wedging post or sheave 15. The sheave 15 possesses a substantially teardrop configuration and is formed with a tapered lower surface corresponding to the tapered socket defined by the inner edges of the blocks 13. The post or sheave 15 carries at its central region a pin 17 which extends outwardly on either side thereof. The pin 17 extends through a pair of registering slots 18 which are provided intermediate the ends of the sections 11 of the outer casing. Engaging the pin 17 at either end are a pair of spaced parallel lever arms 19 which extend along the outer side surfaces of the casing 10. The pin 17 is headed at either end on the outer sides of the levers 19, and upon longitudinal movement of the levers 19, slides within the slots 18 formed in the casing sections to impart movement to the teardrop-shaped sheave 15.

As will be seen from Fig. 2, the post or sheave 15 is arranged for limited sliding movement within the casing 10 into and out of substantially abutting relation to the inner opposed edges of the blocks 13. Advantageously, the entire marginal edge portion of the sheave 15 may be arcuately grooved so as to provide a cable-receiving surface corresponding to the contour of a given size cable. By the same token, the inner edges of the blocks 13 are also preferably arcuately grooved so as to conform to the curvature of a given size cable, and thereby provide an increased contacting surface between the cable, the blocks 13, and the sheave 15.

Slidably carried within the casing adjacent to the rounded end portion of the sheave 15 is a sliding block 19a which has its side edges arcuately recessed, as at 20, in substantially concentric relation to the arcuately rounded portion of the sheave 15. The block 19a is connected with the sides of the casing 10 by means of a pair of pins or studs 21 which extend through either side of the casing sections through slots 22 formed within the block, whereby to provide for limited sliding movement of the block toward and away from the arcuately rounded end of the sheave 15.

Pivotally carried within the upper end of the casing 10, as by means of a pivot pin 23, is a hand-operated lever 24 which is mounted for swinging movement about the pivot pin 23 into a position substantially abutting one of the side edges of the casing 10, as shown in Figs. 1 and 2. The lever 24 is formed at its pivoted end with a relatively enlarged eccentrically disposed cam face 25 which, upon swinging movement of the lever, rides in sliding engagement with the upper edge of the sliding block 19a. The contour of the cam face 25 is such that upon swinging movement of the lever 24 to a position alongside the casing 10, as shown in Figs. 1 and 2, the block 19a will be forced to its innermost position within the casing whereby to engage the looped portion of the cable 14 disposed about the arcuately rounded surface of the sheave 15, and force the sheave to its innermost position within the casing and into substantial wedging engagement with the inner edges of the blocks 13.

As will be noted, particularly in Fig. 2, inward movement of the block 19a in response to swinging of the lever 24 to its position alongside the casing, effectively clamps the intermediate portion of the cable 14 between the lower face of the block 19a of the arcuate surface of the sheave 15, and between the tapered edges of the sheave 15 and the opposed edges of the blocks 13. Movement of the lever 24 in a clockwise direction, as viewed in Fig. 2, permits the block 19a and sheave 15 to move upwardly within the casing and free the associated cable for movement about the sheave.

The relatively enlarged end portion of the lever 24 is also formed with a slot 26 through which extends a pin 27 whose outer ends slidably extend through a pair of transversely registering and relatively elongated arcuate slots 28 formed in the casing sections 11. The pin 27 further extends through openings provided in the upper end portions of the lever arms 19, and effectively secures such arms in relatively close fitting relation alongside the outer surfaces of the casing sections 11, as shown particularly in Fig. 3. The extreme outer end portions of the pin 27 pivotally receive the outer ends of a bifurcated link 29 which normally extends outwardly from the upper end of the casing, and which has its opposite end pivotally connected, as at 30, with an attachment hook 31.

The arcuate slots 28 formed within the sections 11 of the casing have one of their ends terminating substantially along the plane of the outer end of the casing, and their opposite ends terminating just beyond the center line of the casing below the pivot pin 23. Thus, as the lever 24 is swung in a counterclockwise direction, as viewed in Fig. 2, to its abutting position with respect to the side edge of the casing, the pin 27 is forced from the outer to the inner ends of the slots 28 to draw the link 29 inwardly toward the center of the casing, whereby to decrease the effective length or extension of the link 29 with respect to the casing.

Due to the arrangement of the pin-receiving slot 26 with respect to the pivot pin 23, the pin 27 is moved to a past-center position, as shown in Fig. 2, when the lever 24 occupies its position alongside the casing 10. Thus, any force pulling outwardly upon the link 29 only serves to force the lever 24 into tighter abutting relation to the casing, thereby providing a past-center lock for the lever and its associated elements.

In operation, the free end portion of the flexible cable 14, which may have its opposite end secured by any suitable means, such as a hook link 32, to a stationary support, indicated at 33, is directed inwardly through the opening provided at the lower end of the casing and around the marginal edges of the sheave 15 and back outwardly through the end opening of the casing. The initial insertion of the cable 14 about the sheave can be accomplished only with the lever 24 occupying its upward or outwardly extended position with respect to the casing. With the lever 24 occupying such outward position, the sheave 15 is drawn out of its clamping position with respect to the edges of the blocks 13 and raised within the casing by the pin 17 carried upon the outer ends of the levers 19.

As shown particularly in Fig. 2, the length of the slot 26 formed in the head of the lever 24 provides for initial movement of the cam face thereof with respect to the block 19a prior to moving the pin 27 from its past center position. This enables the block 19a to be loosened upon the cable before upward movement is imparted to the links 19 and the sheave 15. Correspondingly, the sliding block 19a is free to ride upwardly within limits provided by the length of the slots 22 and the pins 21. After insertion of the cable within the casing, around the sheave 15 and back outwardly through the end opening, the hook device 31 may be conveniently engaged with an object to be moored or anchored, as indicated at 34, at which time the free end of the cable may be pulled upon to initially tighten the assembly between the stationary support and the object to be moored, and thereafter the lever 24 may be swung downwardly to its position alongside the casing 10 to simultaneously lock the intermediate portion of the cable by clamping the same between the sheave and the blocks 13 and effectively reduce the extension of the link 29 with respect to the casing.

Toward this end, the free end portion of the cable 14 may be provided with a suitable handle member 35 to facilitate the initial tightening or removal of slack between the casing and the ground support 33. The handle 35 may advantageously taken the form of a clip which can be attached to the tensioned portion of the cable to prevent dangling of the free end of the cable after mooring operations are completed. During swinging movement of the lever 24 from its outward to its downward position alongside the casing, the node portion of the cam face 25 engages the upper surface of the sliding block 19a and forces the same downwardly within the casing and into engagement with the intermediate portion of the cable which is looped about the arcuately rounded end of the sheave 15. Further movement of the lever 24 forces the block 19a to its innermost position and consequently forces the sheave 15 to a position imparting maximum clamping forces to the region of the cable disposed between the tapered surfaces of the sheave and the opposed edges of the blocks 13. Simultaneously with the clamping of the looped segment of the cable, the link 29 is moved inwardly of the casing to substantially decrease the effective length of the over-all mooring assembly and thereby remove any slack remaining within the cable. Release of the "tie-down" assembly is accomplished by swinging the lever 24 upwardly away from the side edge of the casing to simultaneously move the link 29 outwardly and release the block 19a and sheave 15. At this time, the cable is free to slide about the sheave and may be adjusted to either increase or decrease the effective length of the over-all assembly.

In view of the foregoing, it will be seen that the present invention provides an improved and mechanically efficient cable-anchoring or "tie-down" device which is characterized by its quick and easy action in simultaneously clamping an associated cable and removing slack therefrom when interposed between relatively movable and stationary objects. The present cable-clamping device is characterized by an absence of springs or other resilient means which would ordinarily tend to jam or break during prolonged operation, or to stick when fouled by extraneous matter such as dirt, and thereby prevent efficient operation of the device.

While a single preferred embodiment of the present invention has been disclosed in detail, it will be understood that various modifications as to constructional details may be accomplished without departing from the spirit of the invention or the scope of the following claims.

I claim:

1. A cable-tightening and anchoring device comprising a casing; a pair of relatively spaced angularly related abutments carried within said casing adjacent one end thereof and defining a tapered socket opening at one end of said casing; a sheave member slidably carried within said casing for relative wedging movement with respect to said abutments, said sheave member being formed along the marginal edge thereof with a surface for the looped reception of an intermediate portion of a flexible cable; a block slidably carried within said casing adjacent said sheave member for movement into and out of engagement with a portion of a cable looped about said sheave member, said block being operable upon movement into engagement with a cable looped about said sheave member to move the cable and sheave member toward said abutments, whereby to clamp the cable between the marginal edge of said sheave member and said abutments; a hand-operated lever pivotally mounted in said casing and having a cam face in engagement with said block, said lever being operable upon swinging movement in one direction to move said block into engagement with a cable looped about said sheave member; a first linkage connected between said lever and said sheave member and operable upon movement of said lever in the opposite direction to move said sheave member and a cable carried thereon out of wedging engagement with said abutments; and a connector link attached to said lever and arranged for limited reciprocating movement longitudinally of said casing upon swinging movement of said lever, said link being movable inwardly of said casing in response to swinging movement of said lever in a direction to move said block into engagement with a cable carried on said sheave member.

2. A cable-tightening and anchoring device comprising a hollow casing; means in said casing adjacent one end thereof defining an open-ended tapered socket having spaced acutely angularly related side walls and opening at said one end of said casing; a combination wedge and sheave member slidably carried in said casing for movement into and out of substantial wedging engagement with the side walls of said socket, said sheave member providing a surface for the looped reception of an intermediate portion of a flexible cable; a block slidably carried within said casing adjacent said sheave member and movable in one direction to force said sheave member into substantial wedging engagement with the side walls of said socket, thereby to clamp a cable looped about said sheave member between the side walls of said socket and the edges of said sheave member; a connector link carried by and extending outwardly from one end of said casing and arranged for limited longitudinal movement with respect thereto; a manually operable lever pivotally carried in said casing and having an eccentrically disposed face thereon in engagement with said block and being connected with said connector link, said lever being movable in one direction to slide said block toward said sheave member while simultaneously moving said connector link longitudinally inwardly of said casing; and link means connected between said sheave member and said manually operated lever for moving said sheave member into and out of substantial wedging engagement with the side walls of said socket upon movement of said manually operated lever.

3. In a cable-tightening and anchoring device; a casing having an opening at one end thereof for the introduction of the free end portion of a flexible cable and formed substantially at its opposite end with an arcuate slot, the slot of said casing having one end disposed closer to the center of said casing than the other end thereof; a pin extending through the slot in said casing and slidable from one end to the other thereof; a connector link carried by said pin and extending outwardly from the said opposite end of said casing; means in said casing adjacent the cable-receiving opening thereof providing a pair of relatively spaced angularly related walls; a substantially wedge-shaped cable-receiving member mounted within said casing for sliding movement into and out of substantial wedging engagement with said angularly related walls, said cable-receiving member being movable in one direction within said casing to clamp a cable looped thereabout between the marginal edges of said member and said angularly related walls; a link connected between said cable-receiving member and said pin; and lever means pivotally connected with said pin and movable in one direction to simultaneously slide said pin to the end of said slot closest to the center of said casing and to move said cable-receiving member into substantially wedging engagement with said angularly related walls, said last-named means being movable in the opposite direction to move said cable-receiving member out of wedging engagement with said angularly related walls.

4. In a cable-anchoring device, a casing having an opening at one end thereof to receive an end of a flexible cable; a plurality of angularly related abutments in said casing adjacent said opening; a cable-receiving sheave mounted within said casing for movement into and out of substantial wedging engagement with said abutments and for the looped reception of a portion of a cable introduced within said casing by way of said opening; a connector link extending outwardly from said casing and arranged for limited extensible movement toward and away from the center of said casing; lever means pivotally connected with said casing and said link and operable upon swinging movement to move said link inwardly or outwardly of said casing, and means connecting said sheave with said lever means and operable upon swinging movement of said lever means to move said sheave into and out of wedging engagement with said abutments.

5. In a cable-tightening and anchoring device, a casing having an opening at one end thereof to receive an end of a flexible cable; means in said casing adjacent the opening thereof defining a tapered socket communicating with the opening in said casing; a post member slidably carried with said casing and formed with a tapered region movable into and out of said tapered socket, the outer tapered surface of said post member being movable into substantially abutting engagement with the walls defining said socket, said post member being arranged for the looped reception of a portion of a flexible cable introduced within said casing by way of the opening thereof; a handle member pivotally carried by said casing for movement into and out of substantially abutting relation to one side of said casing; a pivot pin carried by said handle member in offset relation to the pivotal axis thereof; a connector link pivoted to said pivot pin and movable inwardly and outwardly with respect to said casing upon swinging movement of said handle member; and a second link connected between said post member and said pivot pin for moving said post member into and out of substantially abutting relation to the walls of said socket upon pivotal swinging movement of said handle member, said handle member being open upon swinging movement in one direction to simultaneously draw said connector link inwardly of said casing and to move said post member into substantially abutting relation to the walls of said socket, whereby to clamp a flexible cable looped about said post member between the walls of said socket and said post member.

SAMUEL W. HYATT.

No references cited.